United States Patent [19]
Smith

[11] 3,730,243
[45] May 1, 1973

[54] FRICTION LOCKS

[75] Inventor: Howard John Leonard Smith, Badshot Lea, Farnham, England

[73] Assignee: Dzus Fastener Co., Inc., West Islip, N.Y.

[22] Filed: Aug. 26, 1971

[21] Appl. No.: 175,152

[30] Foreign Application Priority Data

Sept. 3, 1970 Great Britain.....................42,283/70

[52] U.S. Cl................................................151/41.5
[51] Int. Cl...............................................F16b 39/28
[58] Field of Search......................151/13, 14, 34, 38, 151/39, 40, 41, 41.5, 69

[56] References Cited

UNITED STATES PATENTS

| 2,420,733 | 5/1947 | Cannova | 151/41.5 |
| 2,737,222 | 3/1956 | Beeker | 151/41.5 |
| 3,141,487 | 7/1964 | Boyd | 151/69 |
| 3,294,140 | 12/1966 | Cosenza | 151/41 |

FOREIGN PATENTS OR APPLICATIONS

| 790,781 | 2/1958 | Great Britain | 151/38 |

Primary Examiner—Marion Parsons, Jr.
Attorney—Daniel H. Kane

[57] ABSTRACT

A fastener comprises a stud having a shank with a screw threaded bore and a receptacle assembly including an externally screw threaded pin over which the stud may be screwed. The receptacle assembly also includes an axially slotted barrel containing a friction clutch which comprises a non-rotatable part in the form of a washer with projections extending into the slots of the barrel and a rotatable part including two members between which the washer is trapped together with a spring washer for providing frictional engagement between the rotatable and non-rotatable parts. The end of the stud has four recesses which cooperate with a pair of projections on the rotatable part of the clutch. As the stud is screwed over the pin the recess in the stud end engage the projections on the rotatable part of the clutch and further turning of the stud is then opposed by the frictional torque provided by the clutch. A light spring is provided within the barrel for urging the clutch into engagement with the stud end.

10 Claims, 2 Drawing Figures

Inventor
HOWARD JOHN LEONARD SMITH

By
Daniel H. Kane
Attorney

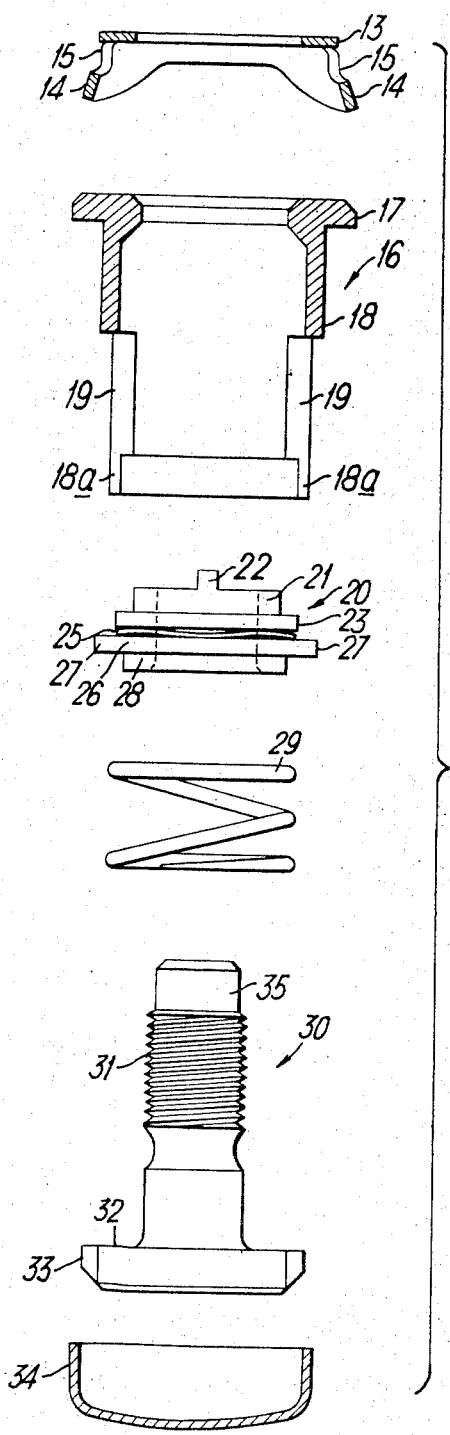

FRICTION LOCKS

This invention relates to quick release fasteners suitable for fastening a panel to another panel or a frame member. Such fasteners are used in aircraft and must therefore be highly reliable. Screw-threaded fasteners are generally more reliable than other types and are specified in various Official Standards. A difficulty arises with screw-threaded fasteners that if the pitch of the threads is coarse enough to allow the fastener to be operated full with only a few turns the fastener is apt to come undone unintentionally particularly if it is subject to vibration. If the pitch of the threads is fine enough to hold the fastener secure against unintentional release an inconveniently large number of turns is required to operate or release it. Various attempts have been made to secure coarse pitch screw-threaded fasteners against accidental release by causing the cooperating screw threads to bind together when the fastener is operated but in every case the screw threads themselves have to be manufactured with with very fine tolerances if the binding of the threads is to be sufficiently tight to prevent accidental release but not so tight that it is difficult or impossible to operate the fastener. Such fasteners also have the disadvantage that the binding of the threads is apt to become loose and ineffective after repeated operation and release of the fastener.

In accordance with the present invention a fastener comprises a stud having a head which is arranged to be turned by a suitable tool and a screw-threaded shank, and a receptacle assembly which has a rotatable part which is urged by spring action into frictional engagement with a non-rotatable part of the assembly, the end of the shank opposite to the head and the rotatable part of the receptacle assembly being formed one with a non-circular socket and the other with a complementary projection, the arrangement being such that as the stud is screwed into the receptacle the recess is engaged by the complementary projection, further turning of the stud then also turning the rotatable part and being resisted by the frictional torque arising between the rotatable part and the non-rotatable part of the receptacle assembly.

With this arrangement, a coarse pitch screw thread can be used, the frictional torque between the two parts of the receptacle assembly preventing unintentional release of the fastener. The frictional torque does not depend on binding of the screw threads of the fastener which can therefore be manufactured with normal engineering tolerances. The shank of the stud may be externally screw threaded, the receptacle assembly having an internally screw threaded bore to receive the stud, but preferably the shank of the stud has an internally screw threaded bore which receives an externally screw threaded pin forming part of the receptacle assembly.

One example of a fastener constructed in accordance with the invention is illustrated in the accompanying drawings, in which:

FIG. 2 is an exploded view with parts in section of a receptacle assembly.

Figure 1:
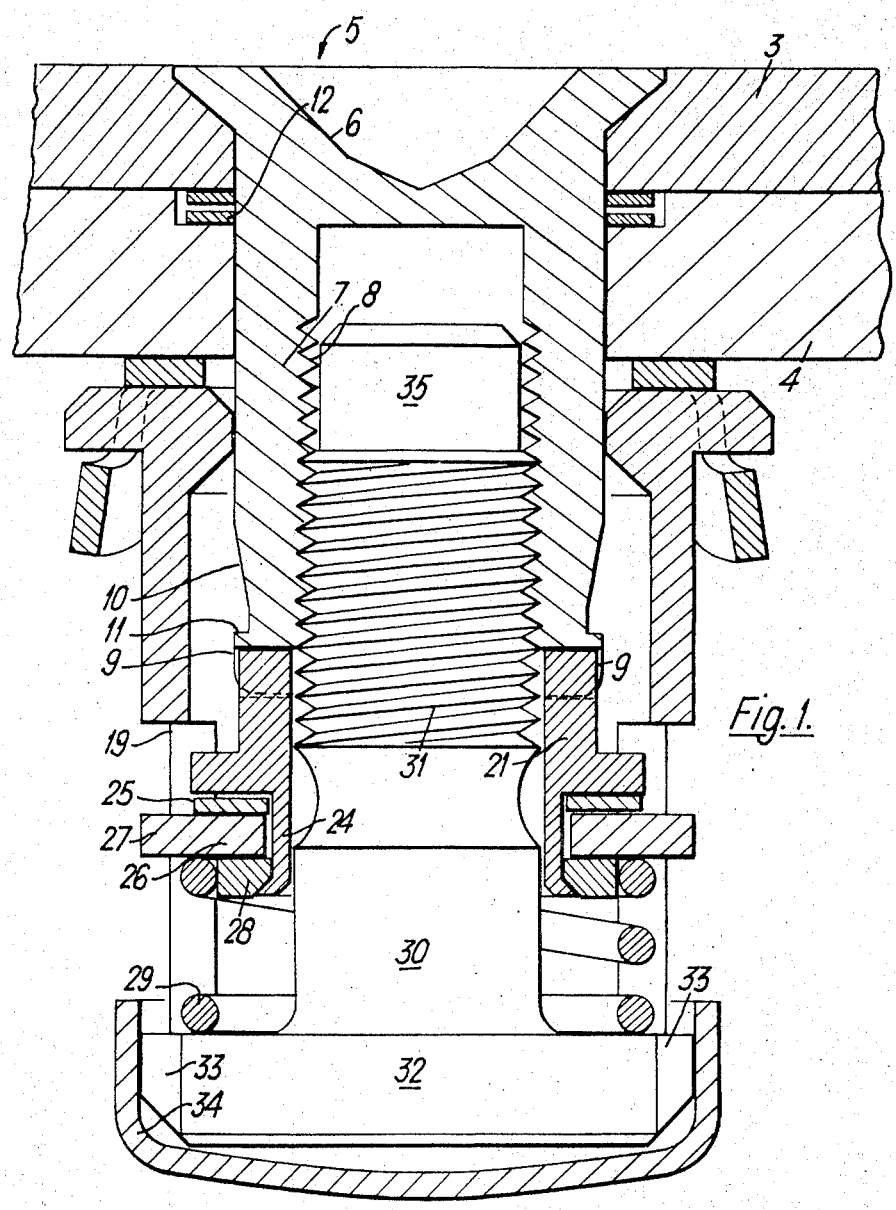
FIG. 1 is an elevation with parts in section.

The fastener is illustrated in FIG. 1 in use holding a panel 3 to a frame member 4. The fastener has a stud 5 with its head formed with a slot 6 for receiving the screwdriver. The slot or slots may be of any convenient form, such as that known as Torq-set (registered Trade Mark). The stud has a shank 7 formed with an internally screw threaded bore 8. The thread is a four-start thread of coarse pitch. The end of the shank has four diametrically opposed notches 9.

The shank 7 has a tapered portion 10 terminating in a radial step 11. A spring washer 12 surrounds the shank in order to hold the stud captive in the panel 3, and the step 11 prevents the washer 12 from sliding over the end of the shank.

A receptacle assembly of the fastener is illustrated in exploded form in FIG. 2 and includes a cage 13 which is arranged to be riveted to the member 4 and which has two spring wings 14 formed with slots 15. A barrel 16 has two projections 17 which are received in the slots 15 in the cage in such a way to permit small radial freedom of movement of the barrel relatively to the cage in order to accommodate tolerances in the alignment of the cage with the opening in the member 4 through which the stud 7 projects. A body part 18 of the barrel is formed with two axially extending diametrically opposed slots 19 and terminates in an end portion 18a of increased internal diameter.

A clutch assembly 20 comprises a tubular member 21 formed with a pair of diametrically opposed axial projections 22, a radial flange 23 and a portion 24 of reduced outer diameter which is surrounded by a crinkle washer 25, a flat washer 26 formed with two diametrically opposed radial projections 27, and a retaining ring 28. As is illustrated more clearly in FIG. 1, the portion 24 of the tubular member 21 is expanded within the ring 28 so that the crinkle washer 25 is compressed between the washer 26 and the flange 23. The projections 27 of the washer 26 project through the slots 19 in the barrel 16 and a light spring 29 urges the clutch assembly 20 upwards as seen in the drawings. A pin 30 is externally screw threaded at 31 with a thread complementary to the internal thread 8 of the shank 7 of the stud, and has a head 32 provided with diametrically opposed projecting fins 33.

The parts so far described of the receptacle assembly are assembled as shown in FIG. 1 with the head 32 of the pin 30 received in the increased diameter portion 18a of the barrel 16 and with the fins 33 projecting into the slots 19. The end of the portion 18a is crimped over the head 32 and finally an end cap 34 is forced over the fins 33.

In use, the panel 3 is placed in position on the member 4, the shank 7 of the stud passing through the opening in the member 4 and over a plain end portion 35 of the pin 30. In this position the head of the stud will not be flush with the panel 3 and the clutch assembly 20 will, under the influence of the spring 29, occupy an uppermost (as seen in FIG. 1) position relatively to the barrel 16, with the projections 27 at the upper ends of the slots 9. Screwing of the stud onto the threaded portion 31 will cause the end of the shank to abut against the axial projections 22 of the clutch assembly and further turning of the stud will therefore cause the clutch assembly to be pushed downwards against the spring until the notches 9 come into alignment with the projections 22, whereupon the spring 29 will move the clutch assembly upwards to engage the projections in the notches. Because there are two diametrically opposed notches 9 and two projections 22, engagement of the projections in the notches will always occur within one quarter turn after the end of the shank 7 makes contact with the projections 22.

Further turning of the stud also turns the tubular member 21 together with the retaining ring 28, and this opposed by the frictional torque arising between the crinkle washer 25, the flange 23 and the washer 26 which is restrained from turning by the projections 27 in the slots 19. Friction forces also arise between the washer 26 and the ring 28. The stud is turned against this frictional torque until the panel 3 is held firmly against the member 4 and the frictional torque then prevents unintended unscrewing of the stud due to vibration for example. The clutch assembly moves along the barrel with the stud after engagement with the stud and a particular fastener can accommodate a range of different combined thicknesses of the panel 3 and the member 4 if the length of the body part of the barrel 18 with the slots 19 is made long enough.

I claim:

1. A receptacle for use with a stud to form a fastener assembly with the stud having a head which is arranged to be turned by a suitable tool and which has a screw threaded shank, the receptacle comprising:
   a clutch assembly including a rotatable part having a face sub-stantially perpendicular to the axis of the receptacle;
   a non-rotatable part having a face in alignment with the face of the rotatable part; means on one of the rotatable part and the non rotatable part extending into engagement with the other, rotatable part and non rotatable part to maintain said part assembled while allowing relative rotation therebetween;
   spring means for urging the face of the rotatable part into frictional engagement with the aligned face of the non-rotatable part; and
   a recess formed on the surface of one of the rotatable part and the stud shank and a complementary projection on the other of the rotatable part and the stud shank to cooperate so that as the stud is screwed into the receptacle, the recess is engaged by the complimentary projection whereby further turning of the stud also turns the rotatable part and such further turning and subsequent turning in the opposite direction upon unscrewing of the stud is resisted by the uninterrupted frictional torque between the forces of the rotatable and non-rotatable parts of the receptacle.

2. The invention in accordance with claim 1 wherein substantially immediate engagement of the stud and the rotatable part achieves immediate interengagement between the faces of the rotatable and non-rotatable parts.

3. The invention in accordance with claim 1 wherein the receptacle includes an externally threaded and non-rotatable pin for cooperation with an internal screw thread in the shank of a corresponding stud.

4. The invention in accordance with claim 1 includes a barrel formed with at least one axially extending slot and said non-rotatable part within the barrel having a projection extending into the slot and being movable axially along the barrel.

5. The invention in accordance with claim 1 wherein the rotatable part includes two members between which a spring washer and the non-rotatable part are trapped.

6. The invention in accordance with claim 5 wherein the spring washer is a crinkle washer.

7. The invention in accordance with claim 1 wherein the receptacle includes a cage which is arranged to be riveted to one of two members to be held together by the fastener and which retains the rest of the assembly with a limited degree of freedom of movement.

8. The invention in accordance with claim 7 wherein the cage has two slotted spring wings and the receptacle includes a barrel having two radial projections which can be forced between the spring wings until they snap into the slots thereof.

9. The invention in accordance with claim 1 wherein the receptacle is removably assembled to a compementary stud to form a fastener assembly with the stud having a head which is arranged to be turned by a suitable tool and a screw threaded shank.

10. The invention in accordance with claim 1 in which there are four non-circular diametrically opposed recesses formed in the shank of the stud and two complementary projections formed in the rotatable part of the receptacle.

* * * * *